United States Patent
Albouyeh et al.

(10) Patent No.: US 10,929,491 B2
(45) Date of Patent: *Feb. 23, 2021

(54) SOCIAL SHARING PATH USER INTERFACE INSIGHTS

(71) Applicant: INTERNATIONAL BUSINESS MACHINES CORPORATION, Armonk, NY (US)

(72) Inventors: Shadi E. Albouyeh, Raleigh, NC (US); Trudy L. Hewitt, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/453,250

(22) Filed: Jun. 26, 2019

(65) Prior Publication Data
US 2019/0317973 A1 Oct. 17, 2019

Related U.S. Application Data

(63) Continuation of application No. 15/168,410, filed on May 31, 2016, now Pat. No. 10,445,385.

(51) Int. Cl.
*G06F 3/048* (2013.01)
*G06F 16/00* (2019.01)
(Continued)

(52) U.S. Cl.
CPC .......... *G06F 16/9535* (2019.01); *G06F 40/30* (2020.01); *G06Q 50/01* (2013.01)

(58) Field of Classification Search
CPC .... G06F 3/04817; G06F 3/0481; G06F 3/048; G06F 16/9535; G06F 40/30; G06Q 50/01
See application file for complete search history.

(56) References Cited

U.S. PATENT DOCUMENTS 7,213,206 B2 5/2007 Fogg
8,010,657 B2 8/2011 Hall
(Continued)

FOREIGN PATENT DOCUMENTS

CN 104978376 A 10/2015

OTHER PUBLICATIONS

IBM, "List of IBM Patents or Patent Applications Treated as Related (Appendix P)," Jun. 26, 2019, p. 1-2.
(Continued)

*Primary Examiner* — Yongjia Pan
(74) *Attorney, Agent, or Firm* — Robert C. Bunker (57) ABSTRACT

A method for generating a sentiment map user interface is presented. The method may include collecting a plurality of content data, whereby the plurality of content data includes an original message and at least one response. The method may include collecting a plurality content path data. The method may include determining a plurality of user sentiment data based on the collected plurality of content data. The method may include generating the sentiment map user interface based on the determined plurality of user sentiment data and the collected plurality of content path data, whereby the generated sentiment map user interface includes a plurality of user icons indicating a user sentiment, and whereby the plurality of user icons are positioned within the generated sentiment map user interface based on the collected plurality of content path data. The method may include presenting the generated sentiment map user interface to a user.

20 Claims, 6 Drawing Sheets

(51) Int. Cl.
  *G06Q 50/00* (2012.01)
  *G06F 16/9535* (2019.01)
  *G06F 40/30* (2020.01)

(56) References Cited

U.S. PATENT DOCUMENTS

| | | |
|---|---|---|
| 8,185,448 B1 | 5/2012 | Myslinski |
| 8,380,716 B2 | 2/2013 | Mirus |
| 8,736,612 B1 | 5/2014 | Goldman |
| 8,892,734 B2 | 11/2014 | Vaynblat |
| 9,129,008 B1 | 9/2015 | Kuznetsov |
| 9,207,755 B2 | 12/2015 | Byrnes |
| 9,247,021 B1 | 1/2016 | Obbard |
| 9,679,254 B1 | 6/2017 | Mawji et al. |
| 9,871,757 B1 | 1/2018 | Reardon |
| 10,268,664 B2 | 4/2019 | Zheng et al. |
| 2003/0220747 A1 | 11/2003 | Vailaya |
| 2008/0312949 A1 | 12/2008 | Nagasaka |
| 2010/0223581 A1 | 9/2010 | Manolescu |
| 2010/0268574 A1 | 10/2010 | Butcher |
| 2010/0275128 A1 | 10/2010 | Ward |
| 2012/0047447 A1 | 2/2012 | Haq |
| 2012/0109737 A1 | 5/2012 | Setty |
| 2012/0124122 A1 | 5/2012 | El Kaliouby |
| 2012/0158753 A1 | 6/2012 | He |
| 2012/0324363 A1 | 12/2012 | Ward |
| 2013/0018685 A1 | 1/2013 | Parnaby |
| 2013/0018957 A1 | 1/2013 | Parnaby |
| 2013/0117364 A1 | 5/2013 | Bania |
| 2014/0082493 A1 | 3/2014 | Baliyan |
| 2014/0122404 A1 | 5/2014 | Champion |
| 2014/0164994 A1 | 6/2014 | Myslinski |
| 2014/0195610 A1 | 7/2014 | Ken-Dror |
| 2014/0215351 A1 | 7/2014 | Gansca |
| 2014/0317535 A1 | 10/2014 | Russell |
| 2015/0066950 A1 | 3/2015 | Tobe |
| 2015/0268818 A1 | 9/2015 | Zewail |
| 2015/0319119 A1 | 11/2015 | Ryu |
| 2016/0196019 A1 | 7/2016 | Ward |
| 2016/0323395 A1 | 11/2016 | Matas |
| 2017/0092148 A1 | 3/2017 | Uno |
| 2017/0214646 A1 | 7/2017 | Longo |
| 2017/0249698 A1 | 8/2017 | Chan |
| 2017/0344225 A1 | 11/2017 | Albouyeh |

OTHER PUBLICATIONS

Mell et al., "The NIST Definition of Cloud Computing," National Institute of Standards and Technology, Sep. 2011, p. 1-3, Special Publication 800-145.

SOCIAL SHARING PATH USER INTERFACE INSIGHTS

BACKGROUND

The present invention relates generally to the field of computing, and more particularly to social networking user interfaces.

As social networking websites have grown in popularity, increasing amounts of content is shared amongst social network users. Content is often presented to users based on what is trending at the time versus what is factual. Furthermore, social networking users may express sentiment in response to content that is shared with them.

SUMMARY

According to one exemplary embodiment, a method for generating a sentiment map user interface is provided. The method may include collecting a plurality of content data, whereby the plurality of content data includes an original message and at least one response. The method may also include collecting a plurality content path data. The method may then include determining a plurality of user sentiment data based on the collected plurality of content data. The method may further include generating the sentiment map user interface based on the determined plurality of user sentiment data and the collected plurality of content path data, whereby the generated sentiment map user interface includes a plurality of user icons indicating a user sentiment, and whereby the plurality of user icons are positioned within the generated sentiment map user interface based on the collected plurality of content path data. The method may also include presenting the generated sentiment map user interface to a user.

According to another exemplary embodiment, a computer system for generating a sentiment map user interface is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include collecting a plurality of content data, whereby the plurality of content data includes an original message and at least one response. The method may also include collecting a plurality content path data. The method may then include determining a plurality of user sentiment data based on the collected plurality of content data. The method may further include generating the sentiment map user interface based on the determined plurality of user sentiment data and the collected plurality of content path data, whereby the generated sentiment map user interface includes a plurality of user icons indicating a user sentiment, and whereby the plurality of user icons are positioned within the generated sentiment map user interface based on the collected plurality of content path data. The method may also include presenting the generated sentiment map user interface to a user.

According to yet another exemplary embodiment, a computer program product for generating a sentiment map user interface is provided. The computer program product may include one or more computer-readable storage devices and program instructions stored on at least one of the one or more tangible storage devices, the program instructions executable by a processor. The computer program product may include program instructions to collect a plurality of content data, whereby the plurality of content data includes an original message and at least one response. The computer program product may also include program instructions to collect a plurality content path data. The computer program product may then include program instructions to determine a plurality of user sentiment data based on the collected plurality of content data. The computer program product may further include program instructions to generate the sentiment map user interface based on the determined plurality of user sentiment data and the collected plurality of content path data, whereby the generated sentiment map user interface includes a plurality of user icons indicating a user sentiment, and whereby the plurality of user icons are positioned within the generated sentiment map user interface based on the collected plurality of content path data. The computer program product may also include program instructions to present the generated sentiment map user interface to a user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for visual user interface sentiment mapping. As such, the present embodiment has the capacity to improve the technical field of social networking user interfaces by providing a visual user interface displaying sentiment mapping to enables users to see the path or trail that content has taken from the content's original source. More specifically, once a social network user posts or shares content, metadata related to the posting is collected from multiple data sources. The collected data may then be analyzed and parsed. Based on the analyzed data, a visual user interface may be generated and presented to the user depicting a sentiment map of the path content has traversed and the sentiment of users that received the shared content.

As described previously, as social networking websites have grown in popularity, increasing amounts of content is shared amongst social network users. Content is often presented to users based on what is trending at the time versus what is factual. Furthermore, social networking users may express sentiment in response to content that is shared with them. When content (i.e., information) is shared in a social network, the factual validity of the content as well as the path the content has taken may not be readily available to the recipients. Knowing the validity of content and where content originated from, as well as various characteristics of the path the content has taken across the social network, may provide greater confidence to the recipient of the information received. This may then help the recipient to decide how and to whom the content should be propagated. Therefore, it may be advantageous to, among other things, provide a way to present validity and origin metadata associated with content to social network users.

According to at least one embodiment, a visual user interface displaying sentiment mapping may be provided to a user that enables the user to see the path or trail that content has taken from the content's originating source, who within the user's extended network has been part of the sharing/commenting/liking of the content, and so forth. Additionally, the visual representation may show sentiment channels based on different sharing paths that the content took within the social network.

Content may be evaluated and analysis of posts, replies, past preferences, likes/not likes, and so forth that may be published and shared in the social networking environment may be used to generate a content sharing map for recipients. Content evaluation and analysis may be done by reviewing and parsing text in order to identify a sentiment or a counter point to the content being posted. For example, a user's reply to a post may be "That is not true, look at this link," thus by parsing and cross referencing the posted content and replies, a counter point may be identified for additional information retrieval to share on that topic for users. Furthermore, key terms such as "I believe," "this is," and "research has shown" may be detected to determine the factual validity of the statements claimed in the content. The source of the content may also be a parameter used to help confirm the validity of the information. For example, content from highly reliable sources may increase the confidence level of content versus one that is from less reliable (or known) sources. This confidence level may be expressed as a veracity value. Additionally, the processing engine may come into account when both viewing and editing content to provide insight into those viewing the content. The processing engine may also be instructed to prevent content from being shared (e.g., via editing) when the content may be determined to not be factual. Thus, a user attempting to share content that is determined to not be factual may be better informed by the collected and displayed sentiment mapping user interface before propagating the content.

The generated user interface may also include whether the content being shared is determined to be a fact or not. For example, the color of a visual indicator may be changed to green if from a reliable source, or to red if the content could not be confirmed, and so forth. An additional user interface feature may include hyperlinks within the generated user interface to allow a user to see alternative sources of information that either validated the content as fact or provide links to sources that indicate that the content is not fact.

Figure 1:
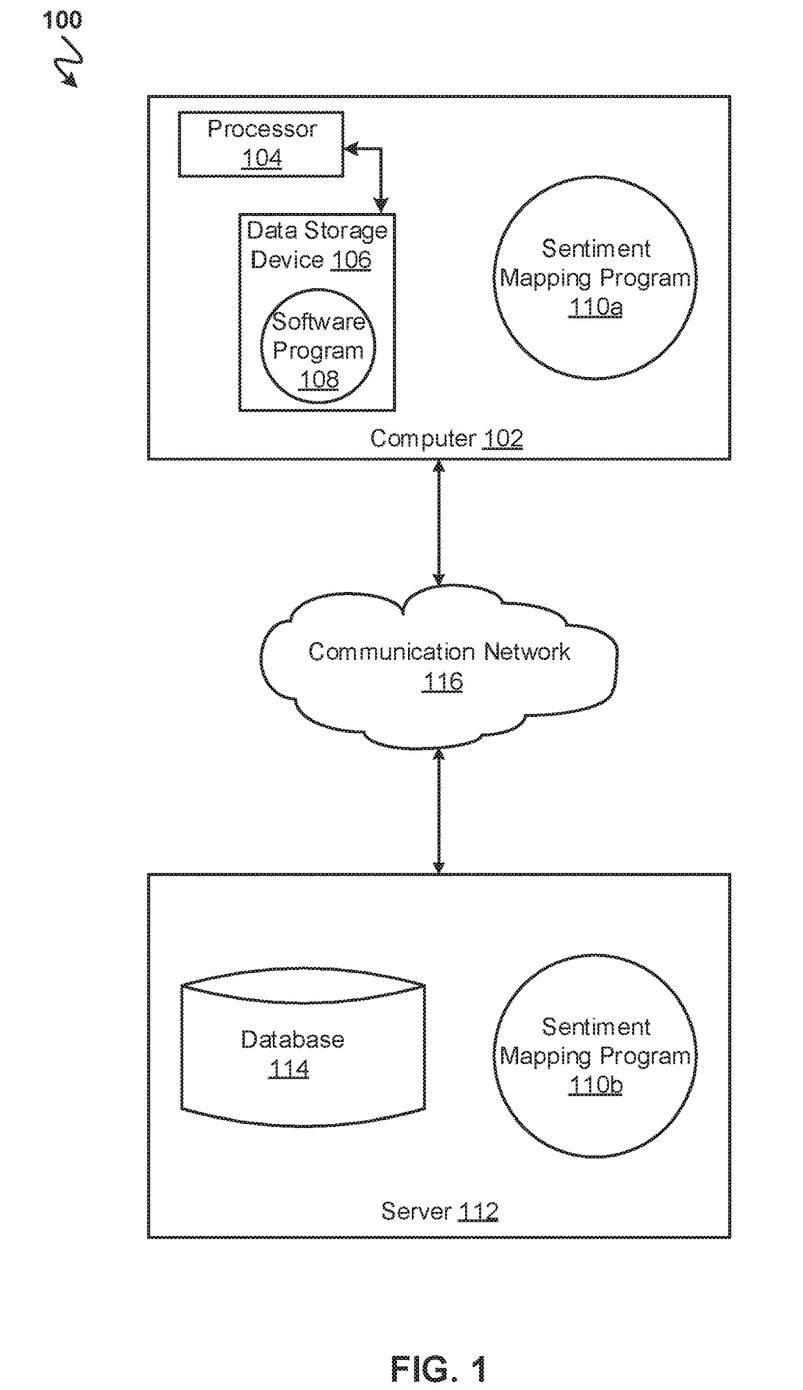
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a sentiment mapping program 110a. The networked computer environment 100 may also include a server 112 that is enabled to run a sentiment mapping program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the sentiment mapping program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the sentiment mapping program 110a, 110b (respectively) to map user sentiment as content is shared among users. The sentiment mapping method is explained in more detail below with respect to FIGS. 2 and 3.

Figure 2:
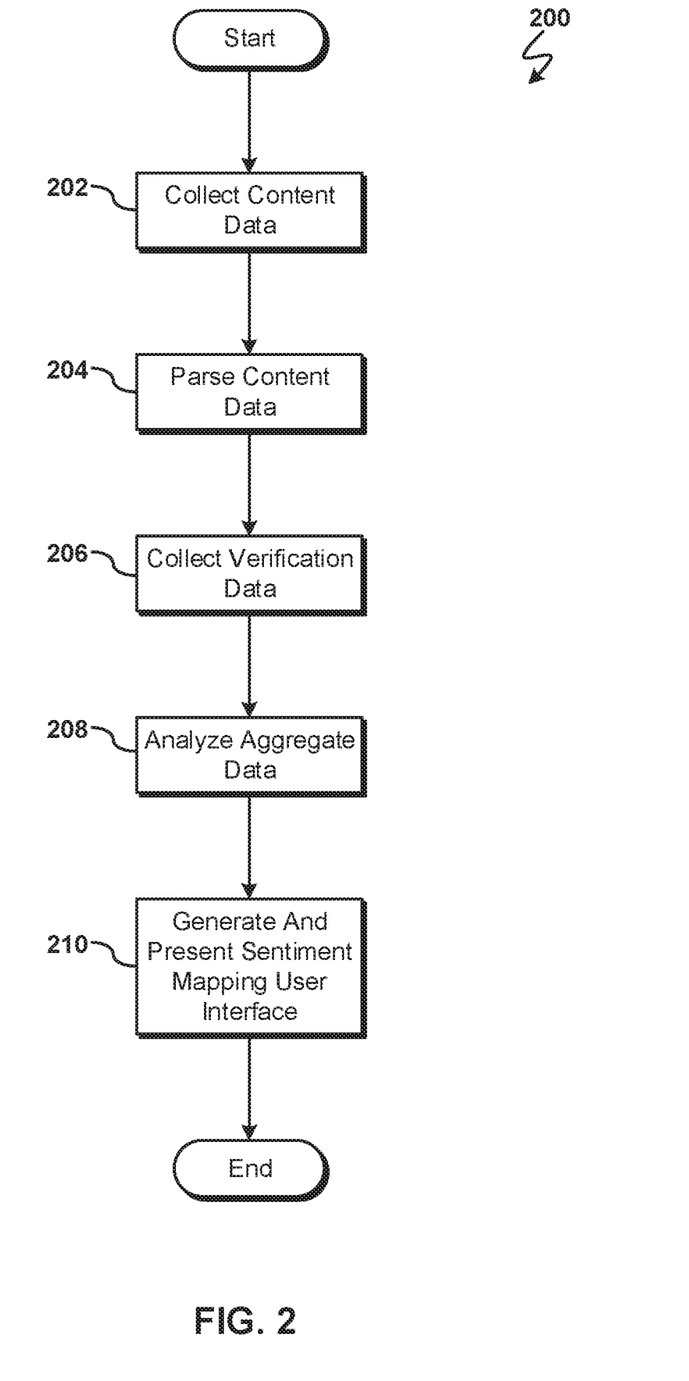
FIG. 2 is an operational flowchart illustrating a process for sentiment map generation according to at least one embodiment.

Referring now to FIG. 2, an operational flowchart illustrating the exemplary sentiment map generation process 200 used by the sentiment mapping program 110a and 110b according to at least one embodiment is depicted.

At 202, data corresponding to electronic content is collected. Electronic content, such as social media postings, may be published or posted by an originating user. Thereafter, the content may be shared amongst the originating user's contacts through a social media network. Content sharing may continue to propagate out amongst social media contacts throughout one or more social media networks. Data corresponding to the content may include the content of the original posting, user reactions (e.g., "like," "dislike," or comments), and the path the content has taken. The data describing the path the content has taken may include which social network users shared the original content and the content sharing order indicating the order in which the original content was shared. According to at least one other embodiment, additional information may be collected, such as events, user preferences, navigation history, location awareness, relationship ties, and so forth. Data corresponding with the content may be gathered from within the social media network or extrinsic sources (e.g., the internet). Data may be collected by querying the social media network using an application program interface (API), or database queries (if the data is stored in a database 114), or by some other method depending on the architecture storing the target content data and metadata.

For example, if an originating user U posts a message about a music concert that U attended, U's contacts A and B may post reactions to the original message indicating that A also enjoys the band that played at the concert while B posts a reaction stating that B does not like the band. Thereafter, data may be collected including the original message, the responses from A and B, the sharing path the content traversed (i.e., from U to A and from U to B), and the concert event information (i.e., time and location) obtained from searching the internet and retrieving relevant data.

Next, at 204, the collected data is parsed. Data collected previously may then be analyzed to extract information for later sentiment map generation. Such analysis may include parsing textual data (e.g., from the original message and any reply comments). Known text parsing algorithms may be utilized to search through the original message to extract words or phrases of interest (e.g., "band X's concert"). Similarly, known parsing algorithms may be used to search though comments posted as replies for words or phrases indicating sentiment (e.g., "I like . . . " or "I do not care for . . . "). If the social media network site has ways for signaling sentiment (i.e., approval or disapproval) without comments, the sentiment may be determined based on the predefined meaning of the sentiment (e.g., data recording a user clicking on a thumbs up symbol corresponding to a user "liking" certain content).

According to at least one embodiment, the data may also be analyzed to determine if information is being posted as facts (i.e., fact assertion). For example, a social media message posting may include information that celebrity Jane Doe visited Atlanta last week stating "My friend saw Jane Doe in Atlanta last Wednesday." After parsing the message, a known algorithm may be used to determine that a statement was made that was presented as a fact.

Then, at 206, verification data is collected. As described previously, according to at least one embodiment, data may be identified that is presented as fact in the original message or subsequent comments posted as responses to the original message. Verification data relating to the identified data presented as a fact may be retrieved from the internet, a database 114, or from another source. Continuing the above example, a social media message posting may have included information that celebrity Jane Doe visited Atlanta last week. The information that a Jane Doe visited Atlanta last week may be identified as having been presented as a fact. Thereafter, a search on the internet may be performed to determine Jane Doe's whereabouts last week. Additionally, the source of the verification data may be collected for ascertaining the reliability of the source. The verification data may include data containing a counterpoint to information presented as a fact.

At 208, aggregated content data and verification data are analyzed. If verification data was collected previously in response to determining information was presented as a fact in the original message or reply comments, the information presented as a fact may be analyzed to determine the accuracy of the information. Using the verification data collected previously, the accuracy of the information presented as fact within the social media posting or comments may be verified. The social media posting or comments may be verified by comparing the fact assertion to the verification data. If the verification data supports the fact assertion, the fact assertion may be verified. For example, if a social media message posting included information that celebrity Jane Doe visited Atlanta last week, the collected verification data may include the celebrity's location throughout the previous week that was discovered through an internet search. If the internet search includes reliable data indicating that celebrity Jane Doe was in Atlanta for a fashion show last week, the fact assertion will be verified as a fact. Furthermore, the source of the verification data may be evaluated. Sources may be evaluated based on predetermined parameters or the reliability of the source may be determined using some other known method and a reliability value assigned based on the evaluation. A veracity value may be determined for the information presented as fact based on factors such as the number and reliability of sources confirming the information or contradicting the information. Predetermined threshold veracity values may define when information may be considered accurate, when the information may be considered inaccurate, and when the accuracy may be considered ambiguous.

Next, at 210, the sentiment mapping user interface is generated and presented to a user. The sentiment mapping user interface may display a path or trail that an original social media content traversed via content sharing and the sentiment of the social media contacts that reacted to the content. Additionally, if a veracity analysis was performed, indications of the determined veracity of the content may also be generated and displayed as part of the sentiment mapping user interface. Visual indicators (i.e., icons) may be generated corresponding to each contact in the content sharing path. Arrows may also be drawn between visual indicators showing the path the content traversed as the content was shared from contact to contact. Additionally, the visual characteristics of the visual indicators may be altered to convey the sentiment of the contact that was determined previously. Visual characteristics of the visual indicators may include icon size, icon shape, icon color, icon labels, icon patterns, icon borders, and so forth. For example, the color of a square corresponding to a contact in the content path may be colored green to indicate a positive sentiment (i.e., "like"), blue to indicate neutral sentiment, and red to indicate negative sentiment (i.e., "dislike"). According to at least one embodiment, the visual characteristics of the visual indicators may also be altered to convey the accuracy of the content or reply. For example, for a reply containing information with a veracity value exceeding the threshold to establish accurate information, the visual indicator may have a green border. According to at least one other embodiment, the visual indicator may show sentiment or accuracy initially, and then switch to show the alternative information (i.e., accuracy or sentiment) once, for example, the user interacts with a button or by moving a mouse cursor over the visual indicator. An example of a sentiment mapping user interface is described in more detail below with respect to FIG. 3.

Once the sentiment mapping user interface is generated, the sentiment mapping user interface may be presented to a user. The user interface may be presented to the user by displaying the user interface on a screen or by some other output method. Additionally, the user interface may be presented to the user in response to a user request to see the sentiment mapping by, for example, clicking on a software-implemented button using a mouse.

Figure 3:
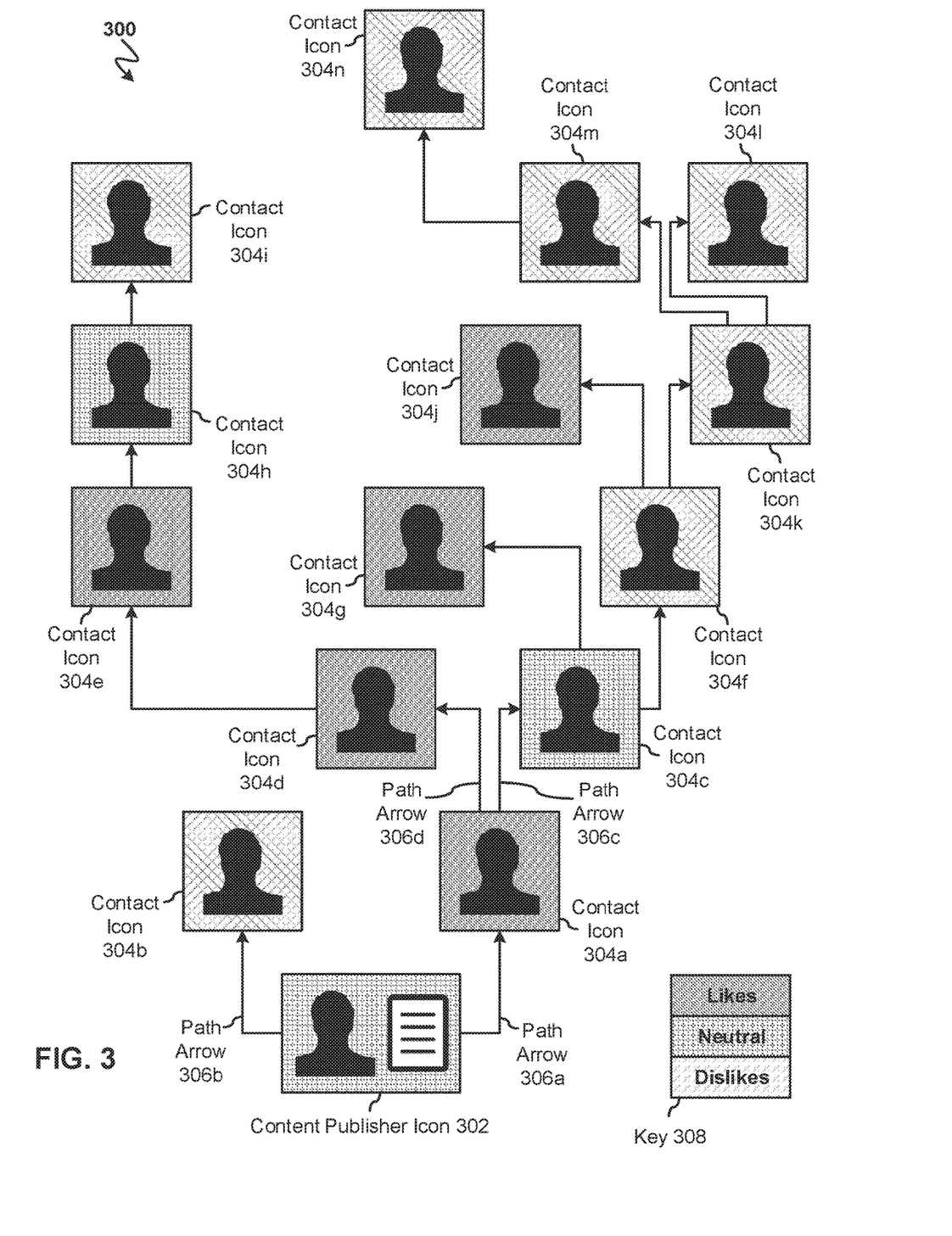
FIG. 3 is a block diagram of an exemplary sentiment map user interface according to at least one embodiment.

Referring now to FIG. 3, a block diagram of an exemplary sentiment map user interface 300 according to at least one embodiment is depicted. The sentiment map user interface 300 may be generated as described previously with respect to FIG. 2. The resulting sentiment map user interface 300 may include an original content publisher icon 302, social media contact icons 304a-n, and content path arrows 306a-d. Additionally, a key 308 may be displayed to indicate the sentiment of contacts represented by the contact icons 304a-n shown by the sentiment map user interface 300.

The path that content traversed from the original content publisher may be organized as the tree-like structure depicted, with the content publisher icon 302 placed at the bottom with contact icons 304a-n placed upwards from the content publisher icon 302 to illustrate how far removed a contact is from the original content posting along the content path. Thus, the contacts that received the content from the original publisher, or first-tier contacts, may have contact icons 304a and 304b placed closest vertically above the content publisher icon 302. Similarly, the second-tier contacts in the content path may have contact icons 304c and 304d placed closest vertically above contact icon 304a corresponding to the contact that shared the content with the second-tier contacts. Placement of contact icons 304a-n may proceed in a similar way until all contacts have been placed in the sentiment map user interface 300 or until space constraints (e.g., maximum screen size or memory resources) preclude placing more contact icons 304a-n. The content sharing path may be depicted using path arrows 306a-d. The path arrows 306a-d may indicate content passing between two contacts by a line and may also indicate a direction using an arrow based on previously collected path data.

As described previously, the visual indicators (i.e., content publisher icon 302 and contact icons 304a-n) may have visual characteristics altered to convey the sentiment of a contact. As depicted in FIG. 3, an icon background pattern may be set to indicate a sentiment. The key 308 indicates a pattern for "Likes," a different pattern for "Neutral," and another pattern for "Dislikes." Based on sentiment data (e.g., thumbs up or parsed rely that contains approving language for "Likes") collected previously, the contact icon 304a-n may be generated with a pattern matching the sentiment of the contact corresponding with the contact icon 304a-n generated. As described previously, other visual characteristics may be altered to convey sentiment, such as color. Additionally, a combination of visual characteristics may be used to indicate sentiment (e.g., icon color and icon shape).

The illustrated sentiment mapping user interface 300 represents an exemplary scenario when an original content publisher shares content, such as a social media message, with two contacts, contact A and contact B. The social media message may indicate that the original content publisher saw band X play at a concert. After posting the social media message, the original content publisher then shared the message with contact A and contact B. Contact A posted a reply indicating that contact A enjoys band X, while contact B posts a reply indicating that contact B does not like band X. Thereafter, contact A shares the original message with contact C and contact D. Contact C replies by stating that contact C has not heard of band X and contact D may reply by stating that band X is a favorite of contact D. The original message is then shared with other contacts.

Based on the above scenario, the user in a social media network that posted the social media message about band X is represented by the content publisher icon 302 placed at the bottom of the sentiment mapping user interface 300. The content publisher icon 302 is given a pattern based on the sentiment determined in the original social media message. As depicted in FIG. 3, the content publisher icon 302 is drawn with a pattern corresponding with a neutral sentiment since the message was determined to be neutral. According to at least one other embodiment, the original content publisher icon 302 may be set to always be neutral or to have no sentiment indicated.

Since the original content publisher shared the social media message with contact A and contact B, contact icons 304a and 304b representing contact A and contact B, respectively, are generated and placed above the content publisher icon 302. Path arrow 306a is drawn to connect content publisher icon 302 and contact icon 304a to indicate that the original content publisher represented by content publisher icon 302 shared the social media content with contact A represented by contact icon 304a. Similarly, path arrow 306b is drawn between the content publisher icon 302 and contact icon 304b. Based on analyzing contact A's reply indicating that contact A likes band X, the contact icon 304a corresponding to contact A is drawn with the pattern indicating a positive sentiment (i.e., "Likes"). The contact icon 304b corresponding to contact B is drawn with a pattern indicating a negative sentiment (i.e., "Dislikes") since contact B's reply expressed dislike for band X.

In similar fashion, contact icon 304c and 304d representing contact C and contact D, respectively, are placed above contact icon 304a to indicate that the social media content was shared by contact A to contact C and contact D. Thus, path arrow 306c is drawn to connect contact icon 304a to contact icon 304c and path arrow 306d is drawn to connect contact icon 304a to contact icon 304d. Based on analyzing contact C's reply indicating that contact C has not heard of band X, the contact icon 304c corresponding to contact C is drawn with the pattern indicating a neutral sentiment (i.e., "Neutral"). The contact icon 304d corresponding to contact D is drawn with a pattern indicating a positive sentiment (i.e., "Likes") since contact D's reply stated that band X was a favorite of contact D. Contact icons 304e-n are also placed and drawn within the sentiment mapping user interface 300 in like manner as shown in FIG. 3.

According to at least one embodiment, user interaction with an icon (i.e., the contact icons 304a-n or the content publisher icon 302) may display additional information. User interaction may include clicking an icon, hovering over an icon with a mouse cursor, or performing a gesture on a touch screen. In response to user interaction, additional information may be displayed as a dialog box, a tool tip, or by displaying the additional information within the icon. Additional information may include hyperlinks to verification data, all or part of the content or reply, or display parts of the message or reply that indicate sentiment.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements. For example, the sentiment map generation process 200 may also be applied to other electronic content sharing environments, such as emails or electronic message boards.

Figure 4:
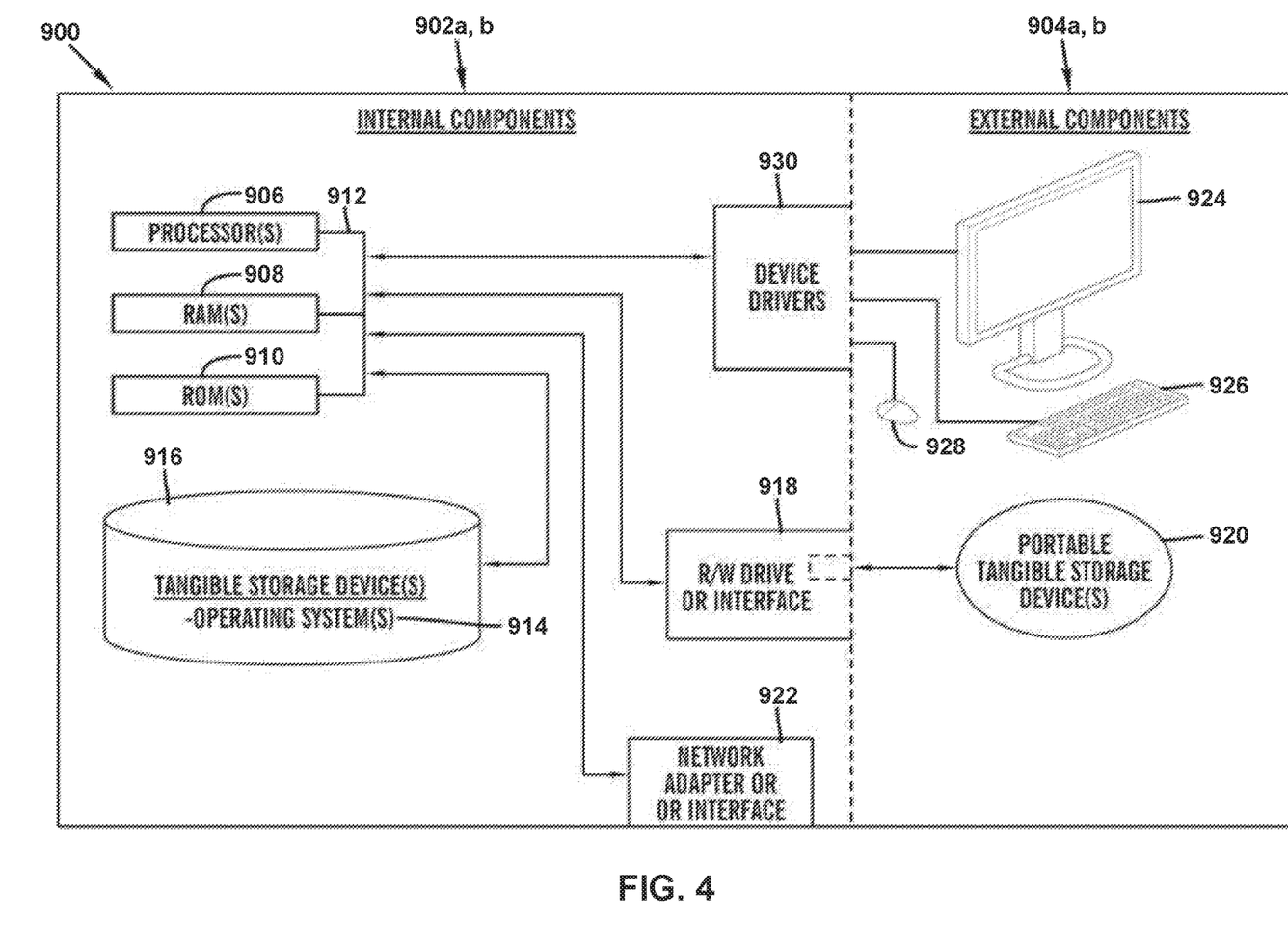
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 4. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the sentiment mapping program 110*a* in client computer 102, and the sentiment mapping program 110*b* in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the sentiment mapping program 110*a* and 110*b* can be stored on one or more of the respective portable computer-readable tangible storage devices 920, read via the respective R/W drive or interface 918, and loaded into the respective hard drive 916.

Each set of internal components 902 *a, b* may also include network adapters (or switch port cards) or interfaces 922 such as a TCP/IP adapter cards, wireless Wi-Fi interface cards, or 3G or 4G wireless interface cards or other wired or wireless communication links. The software program 108 and the sentiment mapping program 110*a* in client computer 102 and the sentiment mapping program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the sentiment mapping program 110*a* in client computer 102 and the sentiment mapping program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
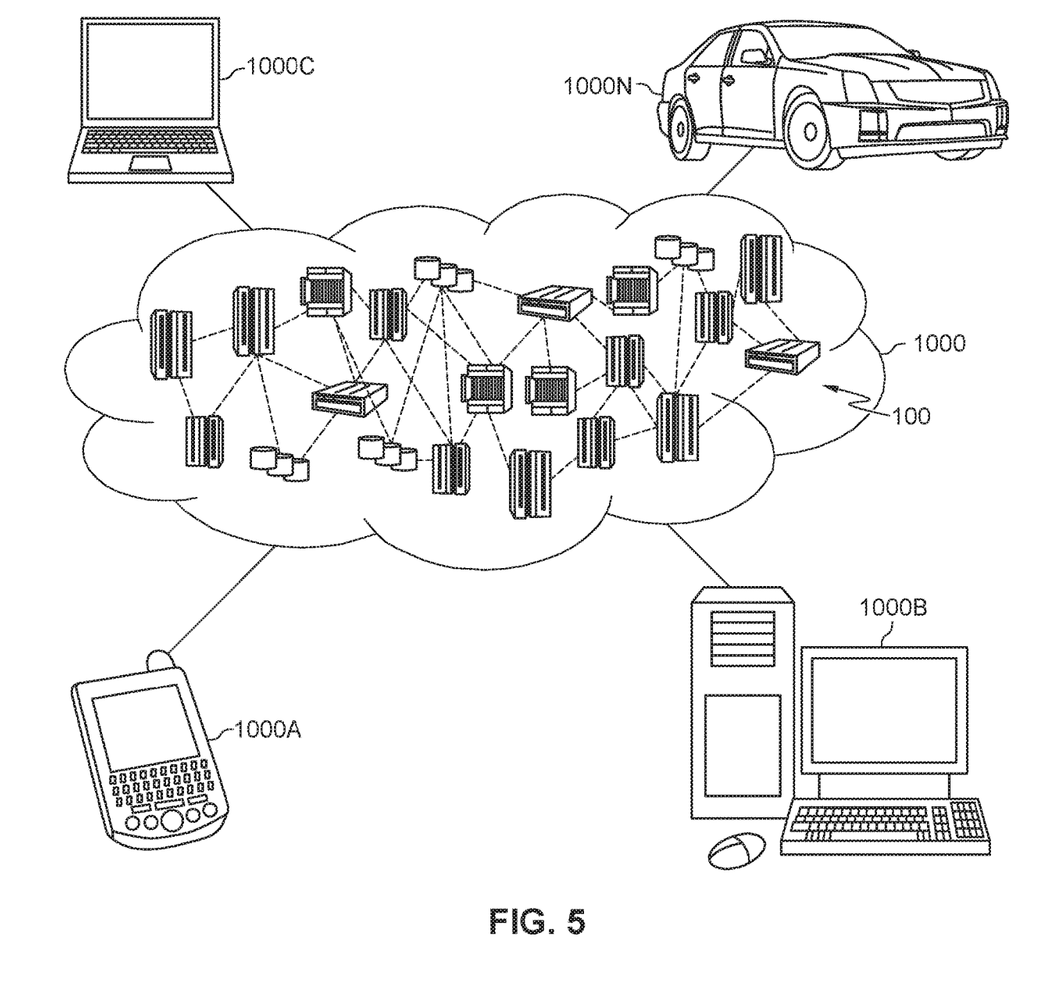
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
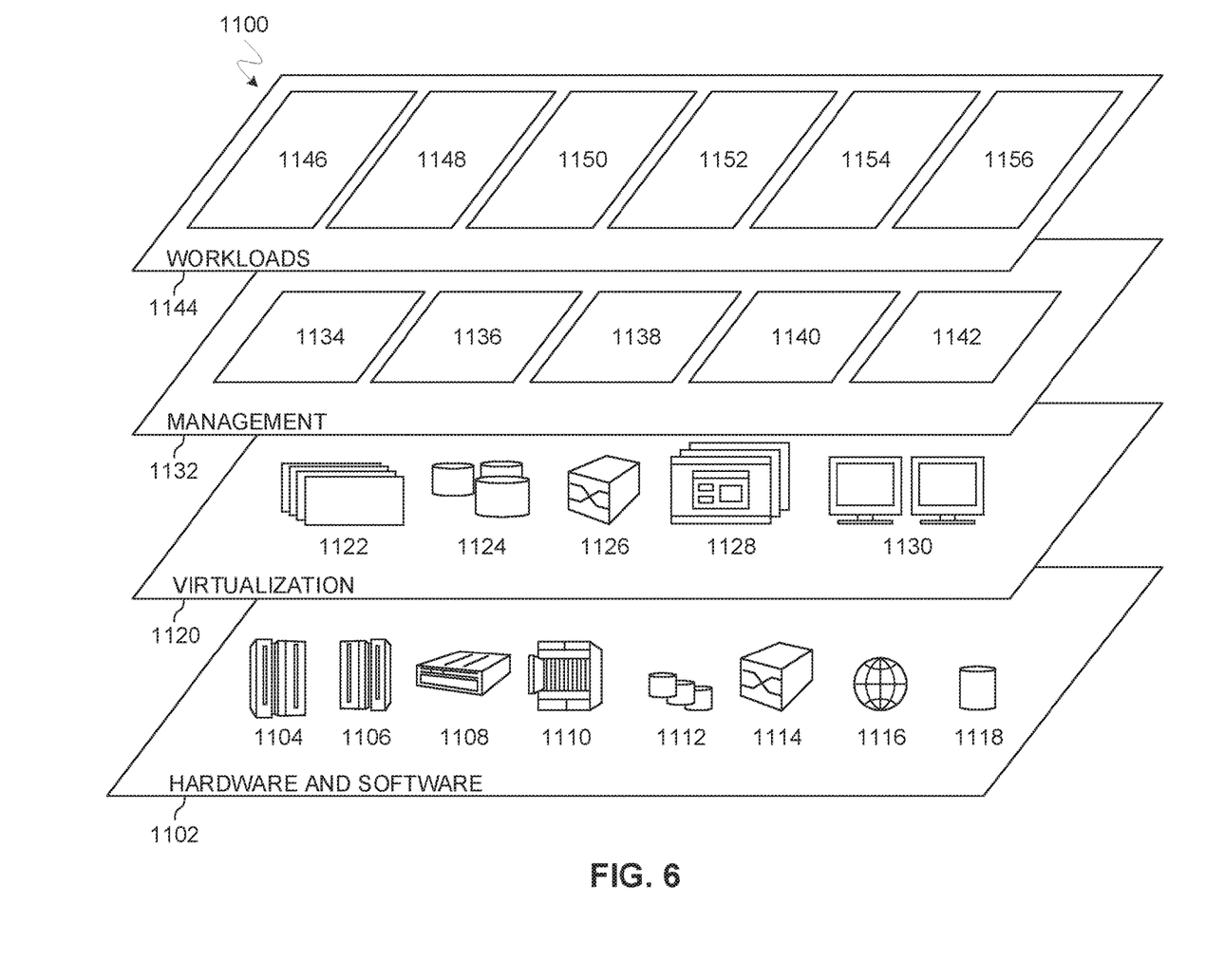
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and sentiment mapping 1156. A sentiment mapping program 110a, 110b provides a way to generate and present a sentiment mapping interface that indicates the path social media content traversed as social media users shared the content and the sentiment of the users that shared the content.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method comprising:
   collecting, by a processor, a plurality of content data shared within a social network;
   collecting a plurality content path data;
   determining a plurality of user sentiment data based on a portion of the collected plurality of content data that indicates a user sentiment;
   identifying one or more fact assertions from within the collected plurality of content data associated with one or more asserting users;
   collecting a plurality of verification data based on the identified one or more fact assertions, wherein the collected plurality of verification data includes one or more hyperlinks to verification data;
   comparing the collected plurality of verification data to the identified one or more fact assertions;
   determining a validity of the identified one or more fact assertions based on the comparison;
   generating the sentiment map user interface based on the determined plurality of user sentiment data and the collected plurality of content path data, wherein the generated sentiment map user interface includes a plurality of user icons indicating the user sentiment, wherein the plurality of user icons are positioned within the generated sentiment map user interface based on the collected plurality of content path data, and wherein the plurality of user icons are altered based on the determined validity of the identified one or more fact assertions;
   presenting the generated sentiment map user interface to a user; and
   in response to detecting a user interaction with a user icon within the plurality of user icons, displaying the one or more hyperlinks to the verification data corresponding with an asserting user associated with the user icon.

2. The method of claim 1, wherein the plurality of user icons indicate the user sentiment by altering at least one visual characteristic associated with the plurality of user icons.

3. The method of claim 2, wherein the at least one visual characteristic is selected from a group consisting of an icon color, an icon pattern, an icon shape, an icon size, and an icon border.

4. The method of claim 1, wherein determining the plurality of user sentiment data based on the collected plurality of content data comprises parsing the collected plurality of content data to identify a word or a phrase indicating the user sentiment.

5. The method of claim 1, wherein the generated sentiment map user interface includes a plurality of visual connectors connecting the plurality of user icons based on the collected content path data.

6. The method of claim 1, wherein collecting a plurality of verification data includes collecting a verification data source and determining a reliability value for the collected verification data source, and wherein altering the user icon within the plurality of user icons comprises altering a visual characteristic of the user icon based on comparing the collected plurality of verification data to the identified fact assertion and the determined reliability value.

7. The method of claim 1, wherein the collected plurality of content path data includes a plurality of content sharing users that shared an original message and a content sharing order.

8. A computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   collecting a plurality of content data shared within a social network;
   collecting a plurality content path data;
   determining a plurality of user sentiment data based on a portion of the collected plurality of content data that indicates a user sentiment;
   identifying one or more fact assertions from within the collected plurality of content data associated with one or more asserting users;
   collecting a plurality of verification data based on the identified one or more fact assertions, wherein the collected plurality of verification data includes one or more hyperlinks to verification data;
   comparing the collected plurality of verification data to the identified one or more fact assertions;
   determining a validity of the identified one or more fact assertions based on the comparison;
   generating the sentiment map user interface based on the determined plurality of user sentiment data and the collected plurality of content path data, wherein the generated sentiment map user interface includes a plurality of user icons indicating the user sentiment, wherein the plurality of user icons are positioned within the generated sentiment map user interface based on the collected plurality of content path data, and wherein the plurality of user icons are altered based on the determined validity of the identified one or more fact assertions;
   presenting the generated sentiment map user interface to a user; and
   in response to detecting a user interaction with a user icon within the plurality of user icons, displaying the one or more hyperlinks to the verification data corresponding with an asserting user associated with the user icon.

9. The computer system of claim 8, wherein the plurality of user icons indicate the user sentiment by altering at least one visual characteristic associated with the plurality of user icons.

10. The computer system of claim 9, wherein the at least one visual characteristic is selected from a group consisting of an icon color, an icon pattern, an icon shape, an icon size, and an icon border.

11. The computer system of claim 8, wherein determining the plurality of user sentiment data based on the collected plurality of content data comprises parsing the collected plurality of content data to identify a word or a phrase indicating the user sentiment.

12. The computer system of claim 8, wherein the generated sentiment map user interface includes a plurality of visual connectors connecting the plurality of user icons based on the collected content path data.

13. The computer system of claim 8, wherein collecting a plurality of verification data includes collecting a verification data source and determining a reliability value for the collected verification data source, and wherein altering the user icon within the plurality of user icons comprises altering a visual characteristic of the user icon based on comparing the collected plurality of verification data to the identified fact assertion and the determined reliability value.

14. The computer system of claim 8, wherein the collected plurality of content path data includes a plurality of content sharing users that shared an original message and a content sharing order.

15. A computer program product comprising:
one or more computer-readable storage medium and program instructions stored on at least one of the one or more tangible storage medium, the program instructions executable by a processor, the program instructions comprising:
program instructions to collect a plurality of content data shared within a social network;
program instructions to collect a plurality content path data;
program instructions to determine a plurality of user sentiment data based on a portion of the collected plurality of content data that indicates a user sentiment;
program instructions to identify one or more fact assertions from within the collected plurality of content data associated with one or more asserting users;
program instructions to collect a plurality of verification data based on the identified one or more fact assertions, wherein the collected plurality of verification data includes one or more hyperlinks to verification data;
program instructions to compare the collected plurality of verification data to the identified one or more fact assertions;
program instructions to determine a validity of the identified one or more fact assertions based on the comparison;
program instructions to generate the sentiment map user interface based on the determined plurality of user sentiment data and the collected plurality of content path data, wherein the generated sentiment map user interface includes a plurality of user icons indicating the user sentiment, wherein the plurality of user icons are positioned within the generated sentiment map user interface based on the collected plurality of content path data, and wherein the plurality of user icons are altered based on the determined validity of the identified one or more fact assertions;
program instructions to present the generated sentiment map user interface to a user; and
in response to detecting a user interaction with a user icon within the plurality of user icons, program instructions to display the one or more hyperlinks to the verification data corresponding with an asserting user associated with the user icon.

16. The computer program product of claim 15, wherein the plurality of user icons indicate the user sentiment by altering at least one visual characteristic associated with the plurality of user icons.

17. The computer program product of claim 16, wherein the at least one visual characteristic is selected from a group consisting of an icon color, an icon pattern, an icon shape, an icon size, and an icon border.

18. The computer program product of claim 15, wherein determining the plurality of user sentiment data based on the collected plurality of content data comprises parsing the collected plurality of content data to identify a word or a phrase indicating the user sentiment.

19. The computer program product of claim 15, wherein collecting a plurality of verification data includes collecting a verification data source and determining a reliability value for the collected verification data source, and wherein altering the user icon within the plurality of user icons comprises altering a visual characteristic of the user icon based on comparing the collected plurality of verification data to the identified fact assertion and the determined reliability value.

20. The computer program product of claim 15, wherein the collected plurality of content path data includes a plurality of content sharing users that shared an original message and a content sharing order.

\* \* \* \* \*